United States Patent

DiTucci

[11] Patent Number: 5,541,484
[45] Date of Patent: Jul. 30, 1996

[54] BLDCM PHASE CURRENT RECONSTRUCTION CIRCUIT

[75] Inventor: Joseph DiTucci, Simsbury, Conn.

[73] Assignee: Carrier Corporation, Syracuse, N.Y.

[21] Appl. No.: 384,776

[22] Filed: Feb. 7, 1995

[51] Int. Cl.⁶ ..................................... H02P 5/06
[52] U.S. Cl. .......................... 318/254; 318/805
[58] Field of Search ..................... 318/254, 439, 318/138, 798–811

[56] References Cited

U.S. PATENT DOCUMENTS

| | | | |
|---|---|---|---|
| 4,234,838 | 11/1980 | Langley et al. | 318/696 |
| 4,353,016 | 10/1982 | Born | 318/254 |
| 4,678,973 | 7/1987 | Elliott et al. | 318/254 |
| 4,743,815 | 5/1988 | Gee et al. | 318/254 |
| 4,928,043 | 5/1990 | Plunkett | 318/254 |
| 5,187,419 | 2/1993 | DeLange | 318/805 |
| 5,367,234 | 11/1994 | Ditucci | 318/254 |

Primary Examiner—Brian Sircus

[57] ABSTRACT

A phase current reconstruction circuit for reconstructing a plurality of phase current waveforms for a brushless direct current motor having a plurality of phase windings, wherein the circuit operates equally well at all motor voltage ranges. The circuit is comprised of a plurality of differential amplifiers for detecting and amplifying voltage signal fluctuations of the detected signal voltage across a plurality of sense resistors exhibiting a low voltage drop regardless of a motor operating voltage employed; a plurality of analog switches for selectively gating the amplified signal voltages with proper phase timing to reconstruct the phase current waveforms; and a plurality of output amplifiers for amplifying the reconstructed phase current waveforms.

3 Claims, 4 Drawing Sheets

BLDCM PHASE CURRENT RECONSTRUCTION CIRCUIT

BACKGROUND OF THE INVENTION

1. Field of the Invention

This invention relates to brushless direct current motors and specifically to a phase current reconstruction circuit for reconstructing a plurality of phase current waveforms for a brushless direct current motor having a plurality of phase windings.

2. Description of the Prior Art

Phase current reconstruction circuits for reconstructing the phase current waveforms for a brushless direct current motor have been designed for low voltage brushless direct current motors. However, a phase current reconstruction circuit which operates equally well at all motor voltage ranges is heretobefore unknown.

Additionally, previous high voltage motor circuit implementations have employed rather complex current sensor elements, such as the LEM. LEM is a commercially available current transducer for the measurement of AC and DC currents providing galvanic isolation between the primary (high power) and secondary (signal) circuits. The present invention uses nothing more than a simple differential amplifier and an associated sense resistor for its current sensor. This simple and low cost circuit lends itself to implementation as a single integrated circuit component.

OBJECTS AND SUMMARY OF THE INVENTION

It is therefore a primary object of the present invention to provide a phase current reconstruction circuit for reconstructing the phase current waveforms for a brushless direct current motor having a plurality of phase windings.

It is another object of the present invention to provide a phase current reconstruction circuit which operates equally well at all motor voltage ranges.

It is a further object of the present invention to provide a phase current reconstruction circuit which reconstructs three phase current waveforms.

It is a still further object of the present invention to provide a simple, low cost circuit that can be implemented as a single integrated circuit component.

These and other objects of the present invention are attained by a phase current reconstruction circuit for reconstructing a plurality of phase current waveforms for a brushless direct current motor having a plurality of phase windings, wherein the circuit operates equally well at all motor voltage ranges. The circuit is comprised of a plurality of differential amplifiers for detecting and amplifying voltage signal fluctuations of the detected signal voltage across a plurality of sense resistors exhibiting a low voltage drop regardless of a motor operating voltage employed; a plurality of analog switches for selectively gating the amplified signal voltages with proper phase timing to reconstruct the phase current waveforms; and a plurality of output amplifiers for amplifying the reconstructed phase current waveforms.

BRIEF DESCRIPTION OF THE DRAWINGS

For a better understanding of these and other objects of the present invention, reference is made to the detailed description of the invention which is to be read in conjunction with the following drawings, wherein.

DESCRIPTION OF THE PREFERRED EMBODIMENT

Figure 1:
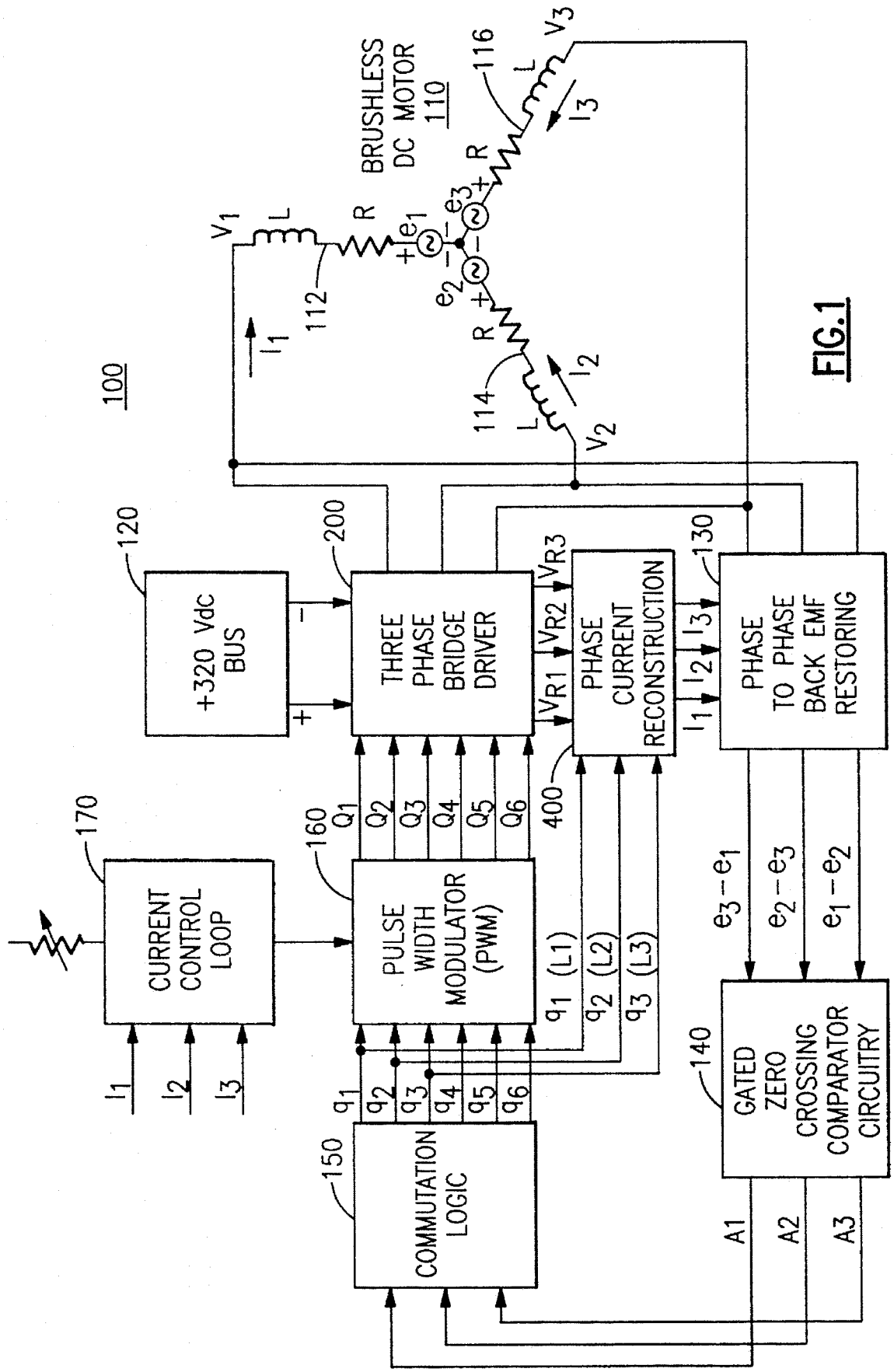
FIG. 1 is a block diagram of a brushless direct current motor including the three phase bridge driver and the phase current reconstruction circuits.

Referring initially to FIG. 1, there is shown a block diagram of the brushless direct current motor control circuitry, generally referenced 100, including the three phase bridge driver 200 and the phase current reconstruction circuit 400. The brushless direct current motor 110 has three phase windings 112, 114, and 116, each winding experiences a back emf voltage denoted as e1, e2, or e3. The back emf voltages are produced by the rotation of a permanent magnetic rotor (not shown). The energization of the phase windings is accomplished by timed application of the phase voltages V1–V3 causing phase currents I1–I3 to flow in the respective phase windings.

The bridge driver circuit 200 in combination with a power supply source 120 selectively applies voltages V1–V3 to the phase windings of the BLDCM (Brushless Direct Current Motor), causing phase currents I1–I3 to flow in the respective phase windings. The phase current reconstruction circuit 400 reconstructs signal voltage waveforms of the currents I1–I3. In one typical application, these reconstructed current signal voltages along with voltages V1–V3 are applied to the phase to phase back emf restoring circuit 130. The restoring circuit 130 generates gain adjusted phase to phase back emf voltages e1–e2, e2–e3, and e3–e1. These signals are further processed by gated zero crossing comparator circuit 140, which compares the phase to phase back emf voltages with ground for zero crossover. Logic level signals equivalent to that obtained from Hall effect sensing devices are generated by the gated zero crossing comparator circuit 140. These signals are applied to commutation logic 150 which produces commutation logic level signals q1–q6. The modulator 160 receives the commutation logic level signals q1–q6 as inputs and a current loop error signal from the current control loop circuit 170. The modulator 160 generates switching signals Q1–Q6 which control the transistors 201–206 (see FIG. 2) of the three phase bridge driver 200.

The lower bridge switches are on for a full 120° commutation period whereas the upper bridge switches are chopping for phase current control during their 120° commutation period. The upper bridge switches connect the power supply 120 to the respective phase windings of the motor 110. The bottom switches, each of which is associated with a winding, connect respective windings back to the power supply 120 via the bus return. The modulator 160 generates the bottom switch signals Q4–Q6 directly from the commutation logic level signals q4–q6. The commutation logic 150 in combination with the pulse width modulator 160 and the current control loop 170 generates the signals Q1–Q3. The drive signal to the three top switches is pulse width modulated by the current control loop error signal in order to maintain a defined current in the brushless dc motor phase windings. Logic level changes in the q1–q6 signals occur at the zero crossover points of phase to phase back emf voltage restoring circuit 130. The analog switch control signals L1–L3 are developed by logic gating of the A1–A3 commutation signals. Note that the timing of the L1–L3 signals is the same as that for the upper switch commutation signals q1–q3.

Figure 2:
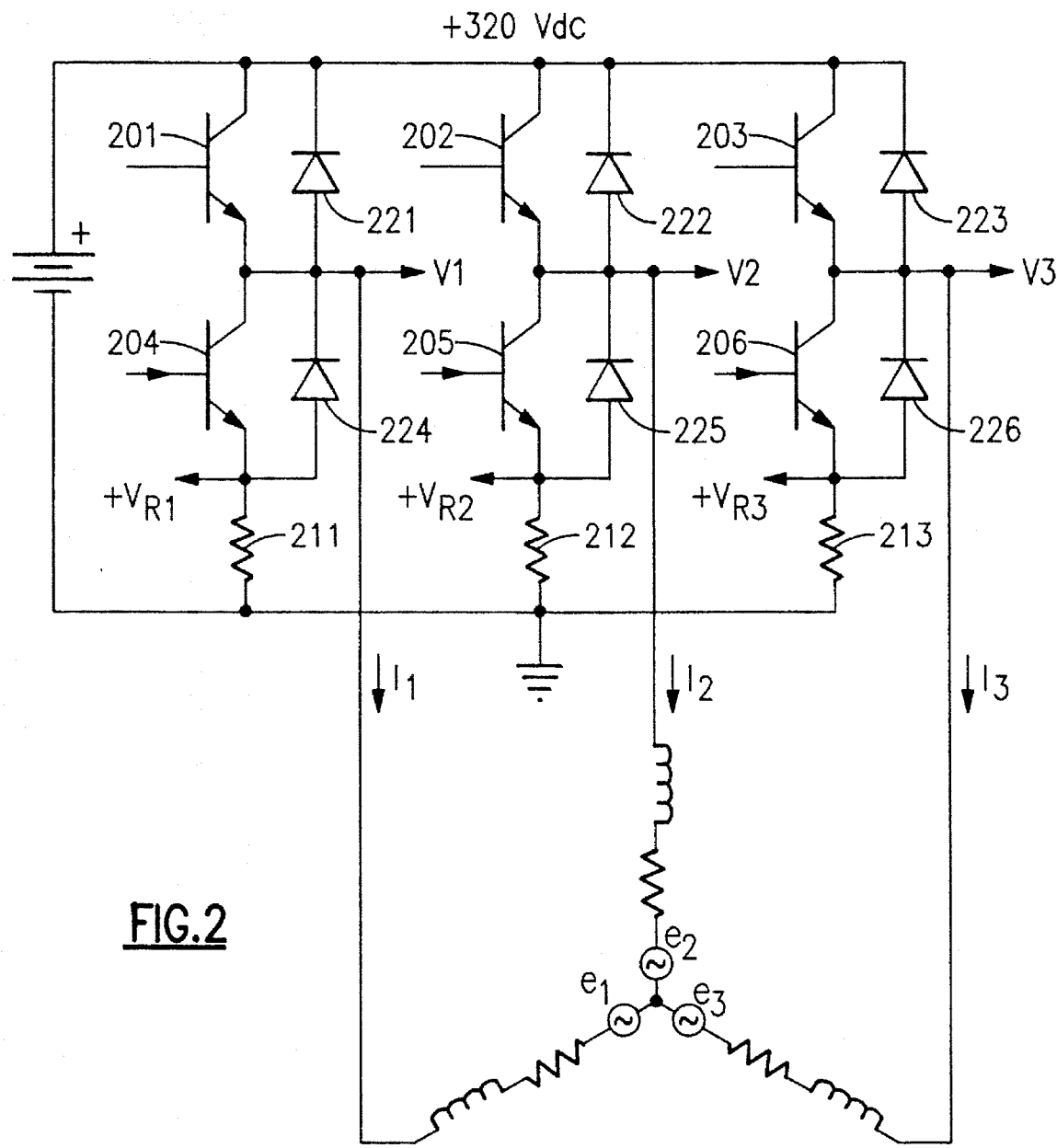
FIG. 2 is a circuit schematic of the three phase bridge driver.

Referring to FIG. 2, there is shown a circuit schematic of the three phase bridge driver referenced generally 200. The switching signals Q1–Q6 act to control transistors 201–206 and thus, the flow of currents I1–I3 to the motor 110. The signal voltages sensed across sense resistors 211–213 are the inputs to the phase current reconstruction circuit 400. Resistors 211–213 are not peak current sensors; they sense in combination with differential amplifiers 421–423 the complete signal waveform of the currents running through them.

The top transistors 201–203 are chopper controlled or pulse width modulated during their 120° electrical commutation period. Current I1 is caused to flow in a positive direction during the transistor 201 chopper ON time. During the transistor 201 chopper OFF time, the motor inductance causes current I1 to continue to flow in a positive direction but it now flows through diode 224. The current through diode 224 develops a negative chopper frequency signal at resistor 211 for 120° electrical. This is a non-useful signal component for the current reconstruction circuit. A positive voltage signal is developed across resistor 211 during the 120° electrical commutation ON period of transistor 204. Current I1 flows in a negative direction at this time.

Figure 3:
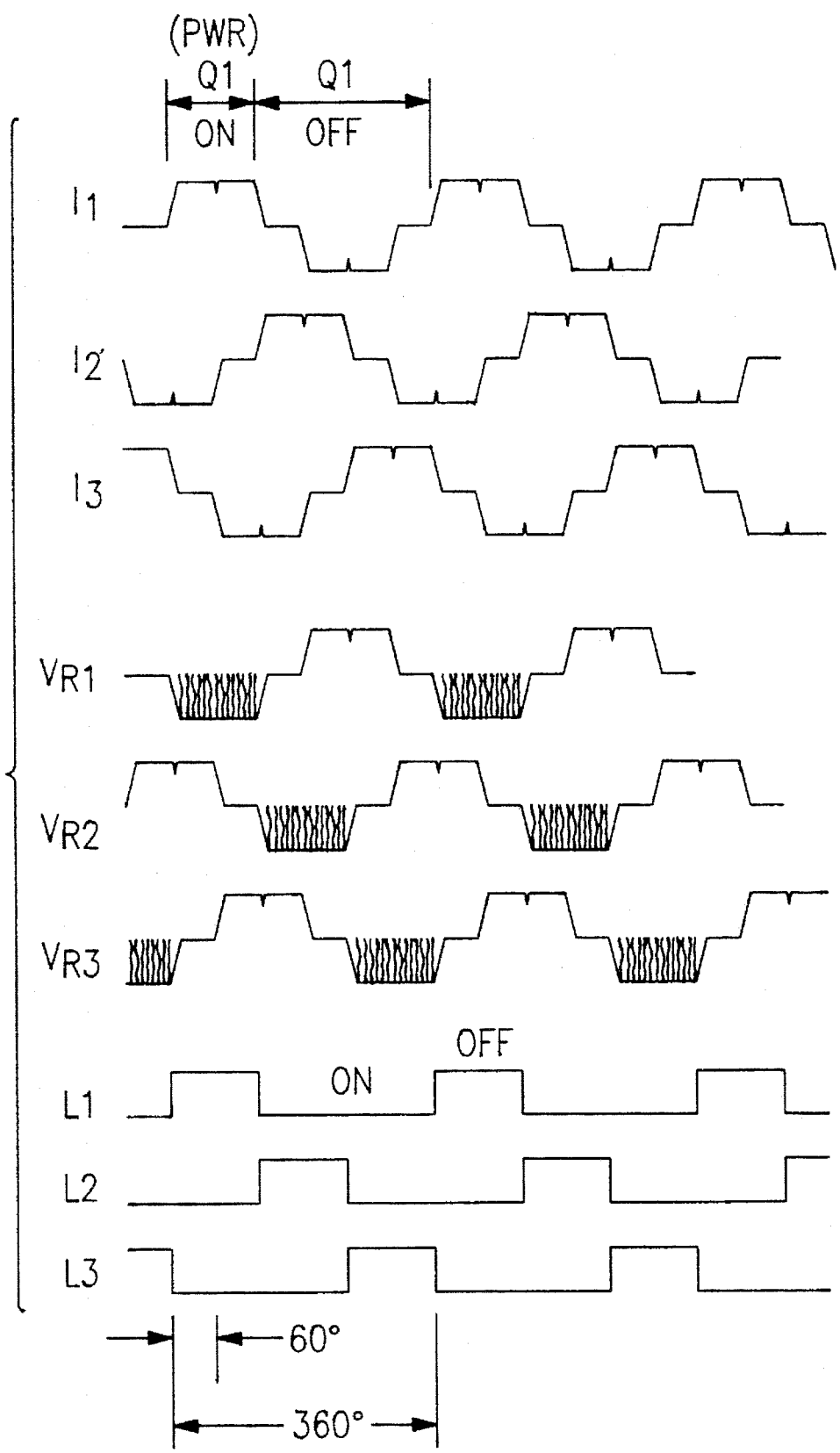
FIG. 3 is an illustration of relevant circuit signal waveforms.

FIG. 3 depicts motor phase currents I1–I3, sense resistor signal voltage waveforms VR1–VR3, and FET analog switch control signals L1–L3.

Figure 4:
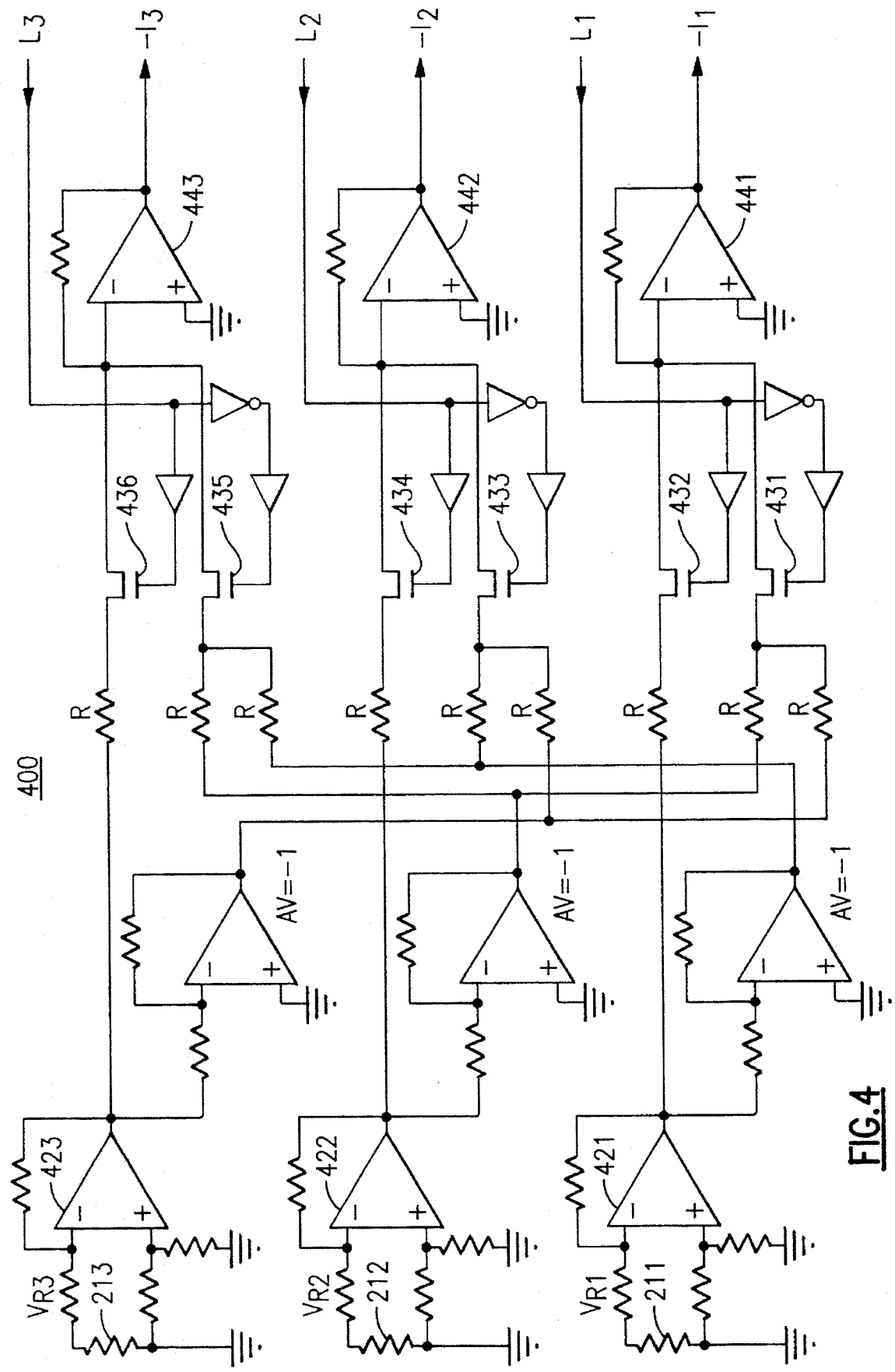
FIG. 4 is a circuit schematic of the phase current reconstruction circuit.

Referring to FIG. 4, there is shown a circuit schematic of the phase current reconstruction circuit referenced generally 400. The signal voltages sensed across sense resistors 211–213 are the inputs to the phase current reconstruction circuit 400. Differential amplifiers 421–423 detect and amplify the signal fluctuations of the voltage signal across sense resistors 211–213. Analog switches 431–436 selectively gate the useful parts of the VR1–VR3 signals with proper phase timing to reconstruct the phase current waveforms. Output amplifiers 441–443 amplify the reconstructed phase current waveforms.

To reconstruct the –I1 phase current signal, the VR1 signal voltage is viewed during the transistor 201 commutation OFF period of 240° electrical and the inverted sum of VR2 and VR3 are viewed during the transistor 201 PWM commutation ON period of 120° electrical. The –I2 and –I3 phase current signals are similarly reconstructed.

While this invention has been explained with reference to the structure disclosed herein, it is not confined to the details set forth and this application is intended to cover any modifications and changes as may come within the scope of the following claims:

What is claimed is:

1. A phase current reconstruction circuit for reconstructing a plurality of phase current waveforms for a brushless direct current motor having a plurality of phase windings, said circuit comprised of:

a plurality of sense resistors for defining a plurality of reconstruction voltages downstream of sets of switching transistors that control the current flowing to the phase windings of the brushless direct current motor, said sense resistors exhibiting a low voltage drop relative to the respective voltages defined by the switching transistors upstream of the phase windings of the brushless direct current motor;

a plurality of differential amplifiers for detecting and amplifying the plurality of reconstruction voltages across the plurality of sense resistors exhibiting the low voltage drop;

a plurality of analog switches for selectively gating the plurality of amplified reconstruction voltages so as to reconstruct the phase current waveforms; and a plurality of output amplifiers for amplifying the reconstructed phase current waveforms.

2. The phase current reconstruction circuit of claim 1 wherein the brushless direct current motor has three phase windings and wherein said plurality of sense resistors comprise three sense resistors each downstream of a set of switching transistors controlling the current flowing to a respective phase winding and wherein said plurality of differential amplifiers for detecting and amplifying the plurality of reconstruction voltages comprise three differential amplifiers for detecting and amplifying the reconstruction voltages across the three sense resistors exhibiting the low voltage drop; and, wherein said plurality of analog switches for selectively gating the plurality of reconstruction voltages comprises: three analog switches for selectively gating the amplified reconstruction voltages so as to reconstruct the phase current waveform; and wherein said plurality of output amplifiers comprise:

three output amplifiers for amplifying the reconstructed phase current waveforms.

3. The phase current reconstruction circuit of claim 1 further comprising:

commutation logic for producing a plurality of commutation signals defining the on and off states of said analog switches for selectively gating the plurality of amplified reconstruction voltages so as to thereby provide proper phase timing to the selective gating of the plurality of amplified reconstruction voltages by said analog switches.

\* \* \* \* \*